Sept. 17, 1968 T. B. WAYNE 3,401,731
HORIZONTAL RICE MILL
Filed June 28, 1965 2 Sheets-Sheet 1

TRUMAN B. WAYNE
INVENTOR.

BY Browning, Simmo,
Hyer & Eickenroht
ATTORNEYS

Sept. 17, 1968     T. B. WAYNE     3,401,731

HORIZONTAL RICE MILL

Filed June 28, 1965     2 Sheets-Sheet 2

TRUMAN B. WAYNE
INVENTOR.

BY Browning, Simms,
Hyer & Eickenroht
ATTORNEYS

United States Patent Office 3,401,731
Patented Sept. 17, 1968

3,401,731
HORIZONTAL RICE MILL
Truman B. Wayne, P.O. Box 13086,
Houston, Tex. 77019
Filed June 28, 1965, Ser. No. 467,427
5 Claims. (Cl. 146—256)

ABSTRACT OF THE DISCLOSURE

A horizontal rice mill for milling bran from the substantially whole kernels of rice grain and including means for subjecting the rice to solvent extraction during the milling. It includes a generally horizontal housing having an inlet section, a milling section, and an outlet section consecutively communicating with each other, and a horizontally ribbed rotor in the milling section for rotation inside of a fixed milling screen.

---

Figure 1:
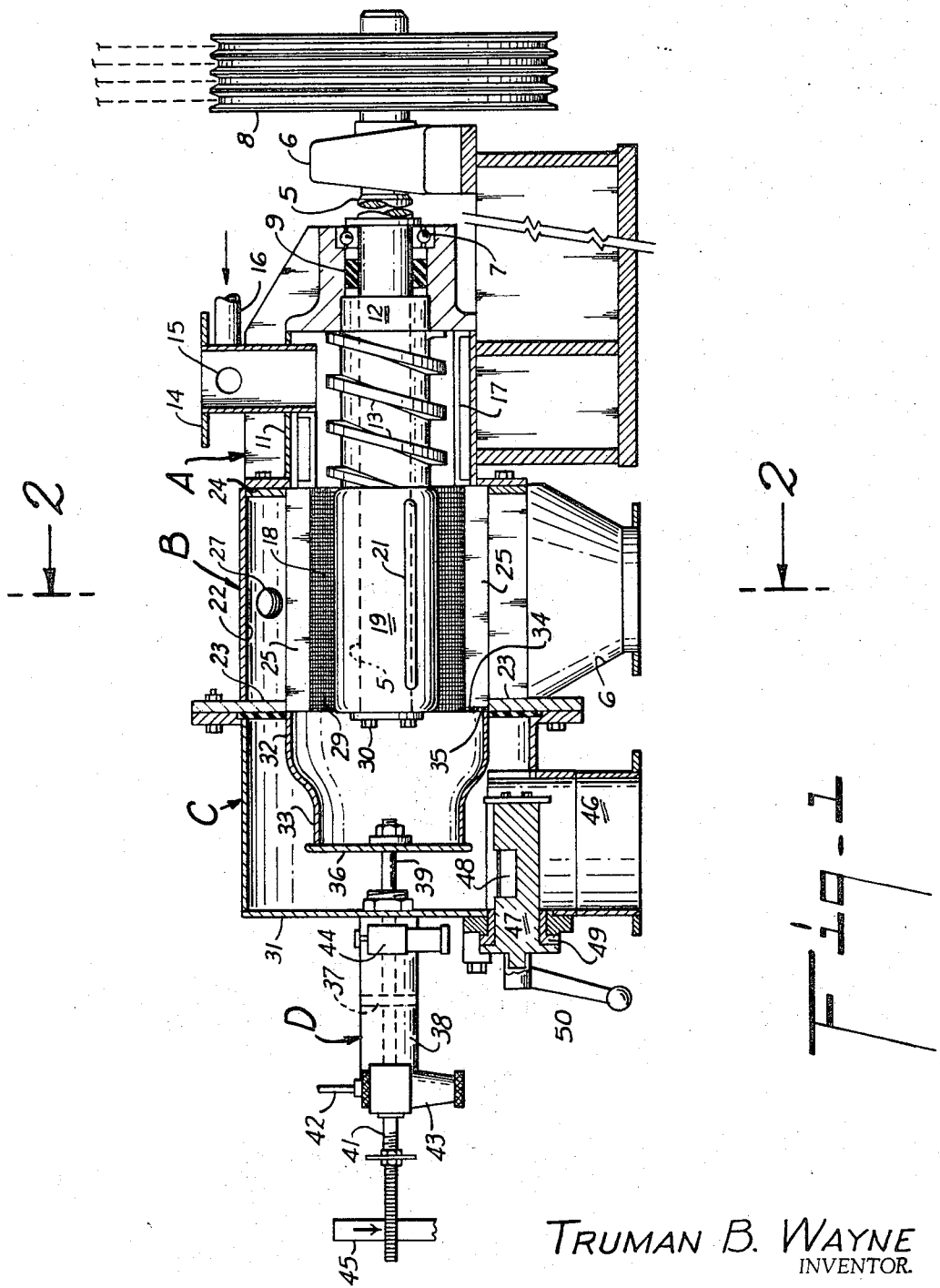

This invention relates to improvements in apparatus for milling bran from substantially whole kernels of grain. It is useful for accomplishing solvent extraction and milling, either in continuous or batch processing of rice, barley, or oil bearing seeds characterized by a removable husk or hull which when removed exposes a germ and pericarp which are removable by milling. It is especially useful in simultaneous solvent extraction and milling of rice, described in my copending application Ser. No. 408,702, filed Nov. 3, 1964, now Patent No. 3,261,690. but is not limited to such use.

Rice in any of its numerous varieties which fall within the three common commercial classifications as short, medium or long grained varieties is the principal cereal grain suited for processing in the present apparatus, although barley may be similarly processed to produce a novel product which differs from the usual "pearled" barley of commerce.

In the rice milling process most widely used at the present time, the rough, or paddy, rice is first cleaned of dirt, straw and other debris and is then sent to stone or rubber shellers which remove the hulls and most of the loosely adhering bran within the hull enclosure and surrounding the more adherent bran layers over the endosperm. The resulting rice, free from hulls and loosely adhering bran, is termed "brown rice."

Brown rice is conventionally milled in machines which consist essentially of a horizontal cylindrical shell against which the rice is rubbed by a rapidly revolving central rotor having a ribbed surface. The horizontally placed rotor is driven at constant speed and is located at a fixed clearance from the cylindrical shell. The lower half of the shell is constructed as a screen. A choke bar is insertable through a slot in one side of the cylindrical shell and a suitable guide arrangement and adjusting means is provided to move the choke bar inward or outward to adjust clearance between the inner edge of this bar and the ribbed rotor. The choking action of the choke bar increases the degree of agitation, and friction between rice kernels, and between the kernels and the revolving and stationary machine parts, and provides increased milling action.

Further control of the milling also is obtained either independently or in combination with the effect of the choke bar by restricting an outlet through which the rice passes when leaving the machine. The rotor usually is equipped with positive acting lead-in flights at the feed end, so that any restriction of the flow of rice either within the annulus between the rotor and the cylindrical shell by the choke bar, or by restriction of the outlet, increases the pressure on the rice and results in increased scouring action.

The surface grinding operation is carried out under time and feed rate conditions which will produce the desired degree of removal of the outer bran layers from the kernels of the rice. This rather severe milling process breaks a substantial proportion of the whole rice grains into two or more fragments, this breakage being due to a combination of effects such as physical impact, mechanical stresses and thermal stresses due to generated heat.

The grains of many rice varieties are relatively long and thin so that they are easily broken by mechanical stresses. Rice also is especially subject to breakage due to heat checking when the temperature rises, and to moisture checking if milled when the moisture content is too high. The loss of whole head rice kernels varies with the variety, state of curing, handling in the rice dryer and subsequent storage, and with the severity of milling. This breakage results in serious economic loss, as broken rice sells for only about one-half to one-third the price of whole head rice.

The conventional rice milling machine, commonly termed a "huller," is not adapted to use as an extractive milling machine because it is neither liquid nor vapor tight. It is fed and its products discharged in the dry state under atmospheric conditions. Nor is it structurally suitable for the introduction and removal of volatile liquid solvents and their vapors to the substantial exclusion of oxygen from the air which may cause explosions and fire.

The mill of the present invention is a substantially liquid and vapor tight wet milling device of horizontal type and includes inlet, milling and outlet sections consecutively communicating with each other. An inlet for grain is disposed in the inlet section preferably in an upper part thereof for gravity feed of grain into the housing of this section. At least one inlet for a liquid organic solvent capable of extracting fatty components from grain is disposed in the inlet section, and preferably in the inlet for grain, to provide the liquid organic solvent in contact with the grain to promote bran layer softening, extraction and cooling.

A means for positively advancing grain from the inlet section into a milling space between a rotor and a screen in the milling section is disposed in the inlet section, and in the milling section a plurality of inlets for solvent are provided, which are arranged to direct streams of solvent upon the exterior of the milling screen. Solvent introduced in this manner penetrates the screen, washes away bran passing through the screen and flows downward through the mass of grain undergoing milling in the milling space. An outlet for bran and solvent which preferably is elongate and extends substantially the full length of the milling section is disposed beneath the rotor and milling screen so that bran, washed from the grain as it is milled, is carried out by the solvent and very little bran remains in milled grain passing from the milling space into an outlet nozzle in the outlet section. This outlet nozzle is disposed to receive grain from the milling space and is provided with a drain communicating with the outlet for bran and solvent mentioned above. The outlet nozzle preferably has large capacity as compared to the milling space so that grain discharged into the nozzle is separated from excess solvent by gravity flow.

A reciprocable closure plate is disposed in the outlet section to move toward and away from the outlet nozzle and is pressed toward a position seated upon and closing the outlet nozzle by a means for applying pressure which preferably is a fluid operated cylinder and piston, the piston being connected to the closure plate by a suitable piston rod. The closure plate is thus pressed toward open position by grain forced into the milling space by the positive feed device in the inlet section and is pressed toward closed position by fluid operated means for applying a selected and adjustable pressure. It is preferred that a sampling means be installed in an outlet from the discharge section so that the degree of milling of grain can be determined at will by an operator who may then adjust the fluid pressure on the device pressing the closure plate toward seating position, if this be required.

It is an object of the present invention to provide an improved rice mill which will substantially reduce the breakage of rice during milling and consequently increase the yield of premium grade whole head milled rice.

Another object is to provide a mill of the above type which is particularly adapted to simultaneous milling and solvent extraction of brown rice.

Another object is to provide an improved rice mill in which a very large proportion of bran removed from the rice grains is separated from milled rice during the milling step.

Another object is to provide an improved rice mill of the above type which may be operated at high speed and at high throughput without development of heat checking in rice undergoing milling.

Another object is to provide an improved mill in which back pressure may be easily and accurately controlled to give high throughput without excessive breakage of rice resulting from pressure, impact and mechanical stresses.

Still another object is to provide a mill of the above type in which the degree of milling achieved is easily determined and controlled.

Other objects and advantages will become apparent to those skilled in the art from the detailed description taken in connection with the accompanying drawings showing an illustrative embodiment of this invention; it is to be understood, however, that this invention is susceptible to various modifications within the scope of the appended claims.

Figure 2:
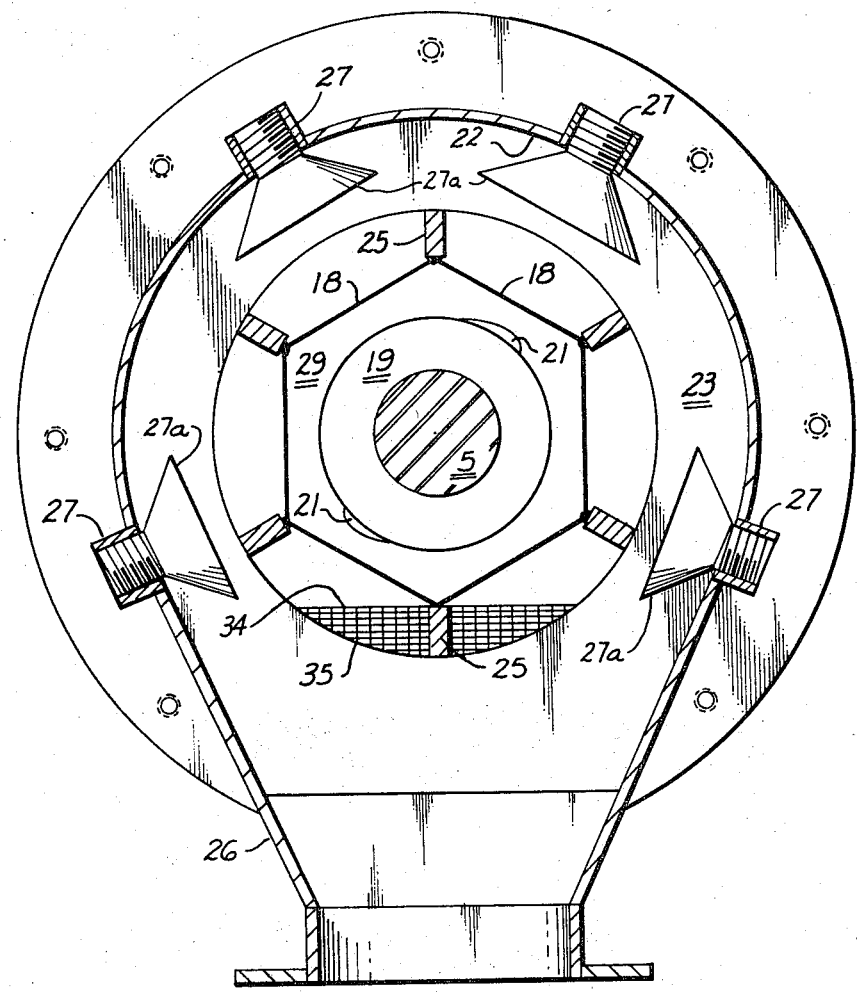

In the drawing, FIG. 1 is a vertical section through one preferred mill embodying principles of this invention, FIG. 2 is a cross-section through the mill of FIG. 1 on the line 2—2.

The mill illustrated includes an inlet section designated generally as A, a milling section designated generally as B and an outlet section designated as C. A shaft 5 suitably mounted for rotation in bearings 6 and 7 and arranged to be driven through a pulley 8 from a source of power (not shown) extends through sections A and B of the mill. A suitable seal 9 is disposed around the shaft in section A to prevent flow of fluid along shaft 5 toward pulley 8.

Section A includes a housing 11 surrounding shaft 5 and a means for moving grain toward the milling section B, illustrated as a cylinder 12 carried by and rotating with shaft 5 and having spiral flights 13 thereon which serve to feed the grain under positive pressure to the milling section B.

An inlet 14 for grain into section A of the mill is provided and preferably extends vertically downward into the mill for gravity feed. At least one inlet 15 for a liquid solvent is provided in the inlet section, preferably in the grain inlet 14, and is connected to a line 16 for introducing liquid solvent from a source (not shown) into the inlet 14 simultaneously with the grain. An inner liner 17 also is provided restricting the diameter of the effective space in the housing around the screw flights 13 to approximately the diameter of a perforate screen 18 in milling section B. The rotary shaft 5, cylinder 12, spiral flights 13, inner liner 17, the grain inlet 14 and solvent inlet 15 thus form a means for positively feeding grain, wet with solvent, into a milling space of the milling section B.

The milling section B includes a rotor 19, having at least one rib 21 on its external surface, centrally disposed in screen 18 and attached to and rotatable with shaft 5. Attachment to shaft 5 may be made by bolts 30, as shown, or in any other manner desired to secure firm attachment and rotation with the shaft. A housing 22 is disposed about the screen, rotor and shaft and has support flanges 23 and 24 arranged to support a series of bars 25 which are arranged to support screen 18. These bars impart sufficient rigidity to the screen that the screen is not bulged outward by pressure of the grain thrown outward against the screen by the ribs 21 on rotor 19. Screen 18 is also firmly anchored against movement along its horizontal axis by inner liner 17 and outlet nozzle 32.

The housing 22 of the milling section B has an outlet at the bottom extending substantially the full length of screen 18. A preferred configuration of this outlet 26 is best shown in FIG. 2. The housing 22 also has a plurality of inlets 27 for solvent arranged to direct streams of the solvent upon the exterior of screen 18. The screen 18 may be cylindrical or it may be a polygonal shape which is preferably hexagonal or octagonal in cross section.

It is preferably constructed of metal sheet having straight, diagonal or end staggered perforated slots of oblong or rectangular shape ranging from 0.024 inch to 0.049 inch in width and ⅛ inch to ½ inch long. When in side staggered configuration, preferred center distances between slots are from ⅛ inch to $^{11}\!/_{16}$ inch. Wire mesh screen, cloth, preferably having rectangular mesh openings comprising from 28 to 55 percent of their total area and in which the weave forms openings which do not exceed 0.050 inch in their narrow dimension and thereby correspond to the slot widths above described, are likewise contemplated.

The inlets 27 for solvent are so arranged that streams of solvent are directed by means of wide angle spray nozzles 27a which are screwed into inlets 27 upon the exterior of the screen and will penetrate into the milling space 29 between the rotor 19 and screen 18 so that rice or other grain being milled will be washed substantially free from disengaged bran by solvent moving downward through the mass of grain being milled. The bran and organic solvent will flow partially by gravity, but largely due to the pressure of rotor 19 on the solvent-wet mass between it and the lower parts of the screen 18.

An outlet nozzle 32 is disposed within housing 31 of the outlet section C and is disposed to receive milled grain passing from the milling space 29 under pressure from flights 13 on cylinder 12. This nozzle has a portion of larger diameter 32 and a portion of smaller diameter 33. The nozzle may be made conical if desired but it is preferred that it be swaged as illustrated and have relatively large capacity as compared to the volume of milling space 19.

The milled grain, wet with liquid, thus enters the outlet nozzle and liquid contained therein drains through a drain opening 34 having a screen 35 therein having slotted or rectangular mesh openings to reduce plugging so that excess liquid drains from the grain in the outlet nozzle through the drain opening 34 into the outlet 26 for bran and solvent, while the screen 35 prevents milled grain from flowing into the outlet 26. As the grain continues to flow into the outlet nozzle 32 the nozzle becomes filled and pressure of the grain is exerted upon the closure plate 36. Plate 36 is movable toward and away from the position illustrated and which it is seated upon and closes outlet nozzle 32. A means for applying pressure tending to force the plate 36 into position to close the outlet nozzle is illustrated as a pneumatic cylinder and piston arrangement designated generally as D.

In the device illustrated, the piston 37 mounted for reciprocation in cylinder 38 is connected to piston rods 39 and 41, respectively, which extend through the corresponding ends of cylinder 38 in gas tight relationship therewith. The piston rod 39 is attached to and carries the closure plate 36 so that pressure in cylinder 38 behind the piston 37 tends to move the closure plate 36 into the position illustrated in which it is seated upon and closes outlet nozzle 32. Pressure in cylinder 38 behind the piston 37 is supplied by compressed air introduced from a source (not shown) through line 42 including a regulating valve 43, by which the pressure may be controlled by an operator. A second valve 44 is provided for bleeding air from the space between piston 37 and the end of cylinder 38 nearest the valve 44. By operation of these two valves an operator can easily select and adjust pressure on cylinder 37 to provide the desired degree of back pressure on grain issuing from outlet nozzle 32. The piston rod 41 preferably is elongate and graduated in units of length which can be read against a fixed marker 45 so that the operator may know the exact degree of clearance between the closure plate 36 and the smaller end 33 of the outlet nozzle.

Although a pneumatic cylinder and controls have been above described, equivalents of the pneumatic system inclusive of hydraulic cylinders, adjustable tension spring devices, exterior weight and fulcrum devices adapted to control the actuation of rod 39 and its attached closure plate 36, and other pressure regulated linear actuators, may be substituted therefor without departing from the principle of the milling pressure control device herein described.

It is preferred that a means for sampling the milled grain be installed in the outlet 46 from housing 31. This sampling means is illustrated as a rotatable and reciprocable cylinder 47 having a slot 48 cut into a side thereof forming a receptacle suitable for receiving a sample of the milled grain. The cylinder 47 is both rotatable and slidable in a bearing 49 in housing 31 and is attached to a handle 50 outside of the housing 31 so that the sampling device may be easily operated at will by a mill operator.

In operation power from a source not shown is applied to pulley 8 to rotate shaft 5, the cylinder 12, the flights 13 carried thereby and the rotor 19. Rice which may if desired have been pre-softened according to my copending application Ser. No. 308,560, filed Sept. 12, 1963, is introduced through inlet 14 and an organic solvent for oil contained in the grain is introduced from a source (not shown) through line 16 and inlet 15. It is preferred that this be a recycled solvent containing from 3% to 10% rice oil.

The resulting wet grain is fed at a constant rate by flight 13 into the milling section 29 between the screen 18 and rotor 19 at a rate which provides a retention time in the milling section which varies with the length of the milling section and the rate of rotation, the shorter the milling section, the shorter the milling time at any specified rotation. A milling period ranging between 15 and 30 seconds within the milling section 29 is normal.

Additional solvent is fed through nozzles 27 upon the outer surface of screen 18 and this solvent flows through the screen into the rice and bran in the milling space, and downward into outlet 26. During the short retention time in the milling space in which the rice is milled substantially free from bran, the bran coat is maintained in a continuously wet and softened condition by the solvent. The heat generated by friction of rice upon the screen and upon adjoining grains is absorbed by the solvent so that heat checking is prevented, the screen is maintained in a thoroughly washed condition so that oily masses do not accumulate and substantially all, that is, up to 97% or more, of the bran removed from the rice in the milling section is washed from the mass of rice grains into outlet 26 with the solvent.

Milled rice wet with solvent passes from the milling space 29 into the interior of outlet nozzle 32. Excess solvent passing out with the grain drains back through the drain opening 34 while the screen 35 prevents loss of milled rice with the solvent.

When outlet nozzle 32 becomes filled with drained grain, pressure is exerted upon closure plate 36 tending to move the plate away from its seated position on the smaller circumference 33 of the outlet nozzle. This pressure is resisted by the pressure in cylinder 38 behind piston 37 and a selected back pressure is applied upon rice at the outlet end of the outlet nozzle 32. Increase in pressure of rice entering from the milling space 29 upon plate 36 unseats this plate and the milled rice falls through an outlet 46 into any desired receptacle or device from which it is taken for further processing but which forms no part of this particular invention.

When describing the actuating cylinder for closure plate 36 the term "fluid" is used. This fluid may be any suitable liquid or compressed gas commonly used in liquid or gas actuated cylinders or other form of reciprocating motor.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described what is claimed is:

1. A mill for milling rice and barley comprising in combination a horizontally extending housing having inlet milling and outlet sections consecutively communicating with each other; a horizontal ribbed rotor in the milling section; a fixed milling screen around the rotor spaced from the rotor and housing, providing a milling space between the rotor and screen; an inlet for grain in an upper part of the inlet section; an inlet for liquid solvent in the inlet section; an inlet casing having screw flights rotatably disposed in the inlet section adapted to feed grain from the inlet section into said milling space under positive lateral pressure, said inlet casing being of substantially the same diameter as said screen; a series of inlets for solvent in the milling section at substantially equal arcuate distances from each other disposed to direct streams of liquid solvent upon the exterior of the milling screen; an outlet for bran and solvent in the milling section below the milling screen; a horizontal outlet nozzle in the outlet section arranged to receive milled grain from the milling section having a drain opening communicating with said outlet for bran and solvent; straining means disposed in said drain opening; a reciprocable closure plate disposed in said outlet section movable toward and away from a position closing said outlet nozzle; means connected to said closure plate for applying adjustable pressure to the closure plate tending to move the plate toward a position closing said outlet nozzle; and an outlet for grain in a lower part of said outlet section.

2. The mill of claim 1 wherein an inlet for liquid solvent is disposed in the inlet for grain.

3. The mill of claim 1 wherein the outlet for bran and solvent is elongate and extends parallel to the rotor for substantially the full length of the milling section.

4. The mill of claim 1 wherein means for sampling milled grain is disposed in the grain outlet.

5. The invention as claimed in claim 1 wherein:
the portion of said horizontal outlet nozzle adjacent to said milling section is at least as large in diameter as said milling space in said milling section.

References Cited
UNITED STATES PATENTS

| | | | |
|---|---|---|---|
| 871,517 | 11/1907 | McDaniel | 146—256 |
| 1,188,151 | 6/1916 | Chapman | 146—256 |
| 1,593,171 | 7/1926 | Hunt | 146—256 X |
| 2,173,630 | 9/1939 | Mori | 146—279 X |

W. GRAYDON ABERCROMBIE, *Primary Examiner.*